Oct. 23, 1962    H. VAN B. POLLOCK    3,059,251
CUSHION MATERIAL
Filed July 23, 1959
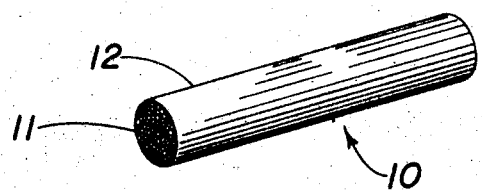
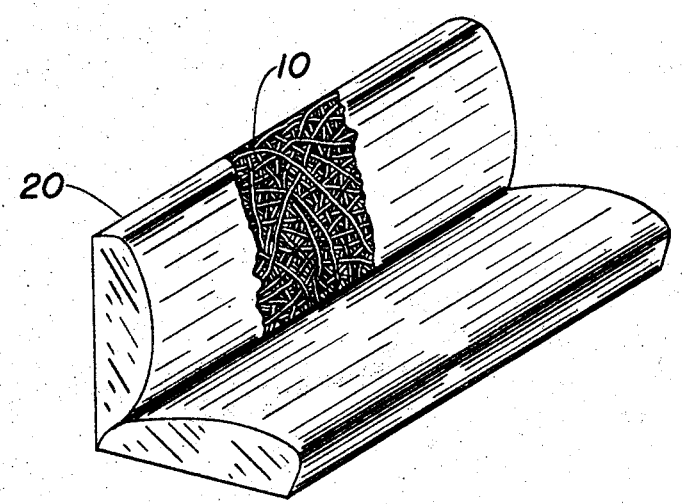
INVENTOR
HAROLD VAN B. POLLOCK
BY
ATTORNEY

United States Patent Office 3,059,251
Patented Oct. 23, 1962

3,059,251
CUSHION MATERIAL
Harold Van B. Pollock, 1222 Douglas Ave.,
Minneapolis, Minn.
Filed July 23, 1959, Ser. No. 829,131
2 Claims. (Cl. 5—361)

This invention relates to a material for filling cushions, mattresses and the like, and more particularly relates to a filling material comprised of foamed resilient elastomeric natural or synthetic polymeric material.

The use of foamed natural or synthetic polymeric materials in upholstered products has been widely accepted. A foam material of a type which may be used to provide upholstering may be comprised of a resilient synthetic or natural polymeric substance such as of a thermoplastic or thermosetting synthetic resin or of natural latex. Such substances may be processed into a state of fluidity and have air or some other gas introduced into the material to form finely dispersed bubbles or capillaries in the material to yield a product which on solidifying is possessed of a structure which resembles that of foam or of a sponge.

A material which may be operably used to provide the article of this invention may be comprised of virgin latex, thermosetting or thermoplastic synthetic polymeric resins or of reclaimed or reconditioned thermoplastic synthetic polymeric resins. In a non-preferred embodiment of the invention, reclaimed or reconditioned latex or thermosetting resin may be operably used if a separate skin construction is utilized to contain the material.

It is well known to utilize trimmings and scraps of foam material from fabricating operations in which webs of foam or sponge material are employed. The pieces that are obtained from such processes are conventionally bonded together into massive form either by heating and welding together the particulate pieces, or by adhering the particulate pieces together by the use of a suitable adhesive.

This invention provides a new process for utilizing scrap pieces of foamed resilient material. The upholstered article that is provided by the method of this invention is possessed of superior properties of strength and resiliency in comparison with conventionally constructed upholstered articles.

It is an object of this invention to provide an improved method of fabricating upholstered articles.

It is another object of this invention to provide an upholstered article having superior properties of resiliency.

It is another object of this invention to provide a material for upholstering furniture which may be manufactured from new or reused synthetic resinous thermoplastic polymeric material.

Other objects will become apparent from the drawings and from the following detailed description in which it is intended to illustrate the applicability of the invention without thereby limiting its scope to less than all equivalents which may be apparent to one skilled in the art. In the drawings like reference numerals refer to like parts and:

FIGURE 1 is a perspective view of a section of foam material which is used in this invention;

FIGURE 2 is a schematic view of an upholstered article constructed in accordance with this invention.

Referring now to FIGURE 1 there is shown a section of a cord of material for use in this invention and designated generally as 10. Cord 10 is comprised of an extruded or otherwise formed foamed resinous core 11 and a continuous web or skin 12 formed about core material 11 to enclose core material 11 throughout its entire length. A provision of a foamed resilient core material with a contiguous web thereabout provides a structure that is possessed of superior properties of physical strength and resiliency in comparison with agglomerate masses of foamed material. Cord 10 is enabled to recover its shape more readily and positively than is foamed material of other configuration. Skin 12, when tensilely deformed exerts an elastic force which tends to return the material to its original form more readily than does a massively foamed material. A greater actual cross-sectional area of material, i.e. the web of skin 12 of cord 10, is deformed in the inventive material than would be the case in a cross-section of massive formed resin of similar diameter. Thus, the return to a state of zero elongation will be more readily and positively achieved by the inventive material than would be a foamed mass of the same apparent cross-sectional area.

Core 11 and skin 12 of cord 10 are preferably of the same or similar composition, and may be comprised of polyethylene, polyvinyl chloride, polyvinylidine chloride, polystyrene or other thermoplastic synthetic resinous materials. In non-preferred embodiments of the invention thermosetting synthetic resinous materials and natural latex materials may also be used.

Core 11 may be comprised of a material with either a continuous or a discontinuous gas phase dispersed therethrough such as of either sponge or foamed polymeric material. It is contemplated that when cord 10 is fabricated from scrap or reclaimed material that a certain amount of foreign inclusions will be present. The presence of these contaminates is not critical to the invention. Thus, it is possible to use salvage materials as well as new materials.

Cord 10 may be manufactured when thermoplastic substance is used by foaming the thermoplastic substance and extruding it through a die of operable size to yield a virtually endless small diameter foamed cord of material. The cord that is extruded will have a skin formed therearound by the extrusion process of forcing foamed matter through a die orifice and will be configured as illustrated in FIGURE 1. When thermosetting resin substances or salvage or reclaimed latex is used it is possible to finally divide the reclaimed materials and pack them into a preformed casing either with the use of adhesive or without the use of adhesive.

In FIGURE 2 is shown an automobile seat 20 wherein cord 10 is used. Cord 10 may be arranged in random manner in between a backing layer and a facing layer without any perceptible degree of orientation to form the cushioning material in seat 20. As may be seen in FIGURE 2 the material of FIGURE 1 may be compressed into regular, irregular or convolute shapes with equal facility and need not be cut or formed to conform to a particular surface configuration of the article in which it is used. The material may be packed in between a backing layer and a facing layer in any manner to occupy volumes of any configuration and to provide a quality article with minimum attention being necessary in placing cord 10 in the upholstered article.

Seat 20 is superior to articles made in conventional manner from foam material of similar composition. The superiority is particularly great when the article is configured to require graduated thicknesses of cushioning material. The fabrication of such an upholstered article is much simplified by the utilization of the construction of this invention in comparison with conventional constructions that are used in upholstered furniture.

The inventive method of constructing a cushion article can be utilized in applications other than in seat construction. Decorative paddings, pillows and the like can be made by utilizing the method of this invention. Any foamable resilient material can be utilized to manufacture the cord, and the skin and the core of the cord may be comprised of materials of different compositions or may be adhered together in non-preferred embodiments.

The cord of polymeric material from which articles constructed in accordance with this invention may be configured may be of any usable diameter, but it is preferred to use a cord having a diameter of from 1/8 inch to 1/2 inch.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. A resilient cushion comprising in combination a layer of foamed polymeric resilent synthetic resin material, said foamed material being disposed between said layers and being configured from at least one cord of polymeric material, said cord having a core comprising a gas phase entrained in a solid phase with a casing thereabout and integral therewith comprising a continuous web of plastomeric, polymeric synthetic resin, said cord being disposed in said cushion with numerous convolutions along its length.

2. The article of claim 1 wherein said solid phase core material and said web are of identical composition.

References Cited in the file of this patent

UNITED STATES PATENTS

| | | |
|---|---|---|
| 2,200,262 | Daley et al. | May 14, 1940 |
| 2,298,986 | Taylor et al. | Oct. 13, 1942 |
| 2,612,966 | Nicol | Oct. 7, 1952 |
| 2,800,165 | Talalay et al. | July 23, 1957 |
| 2,927,876 | Hoppe et al. | Mar. 8, 1960 |